No. 864,410. PATENTED AUG. 27, 1907.
E. J. EDWARDS.
ROLLER BEARING.
APPLICATION FILED OCT. 24, 1906.
2 SHEETS—SHEET 1.
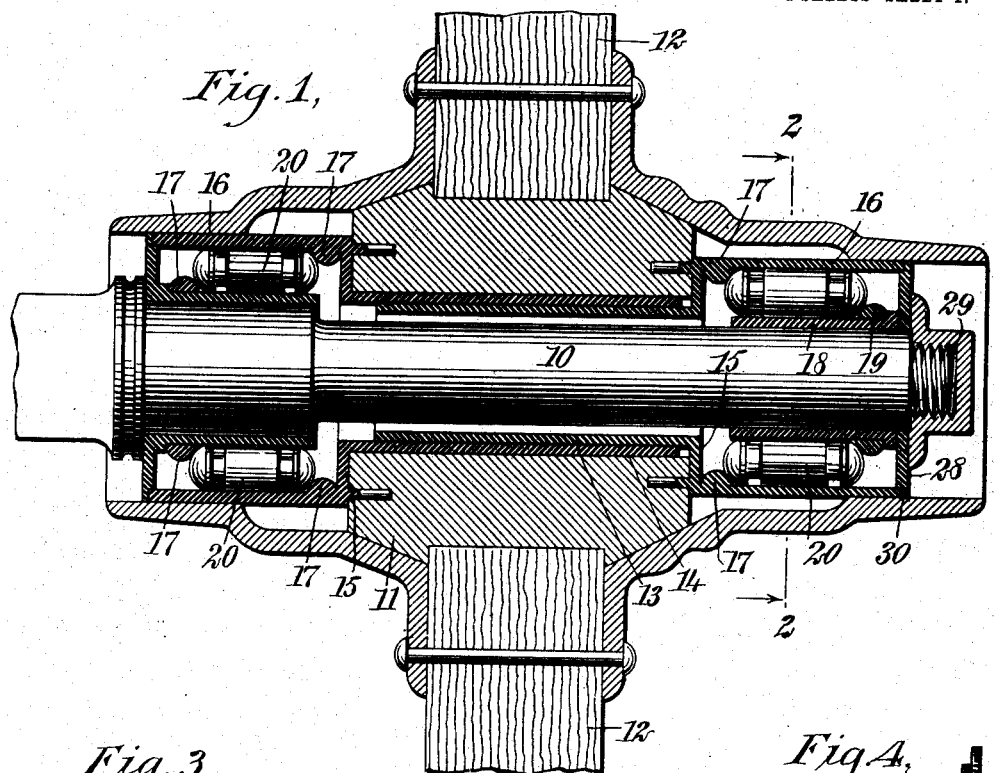
WITNESSES
Edward Thorpe.
C. W. Fairbank.
INVENTOR
Ellsworth J. Edwards
BY Munn & Co
ATTORNEYS No. 864,410. PATENTED AUG. 27, 1907.
E. J. EDWARDS.
ROLLER BEARING.
APPLICATION FILED OCT. 24, 1906.

2 SHEETS—SHEET 2.

WITNESSES
Edward Thorpe,
C. W. Fairbank

INVENTOR
Ellsworth J. Edwards
BY
Munn & Co
ATTORNEYS

UNITED STATES PATENT OFFICE.

ELLSWORTH J. EDWARDS, OF LOS ANGELES, CALIFORNIA.

ROLLER-BEARING.

No. 864,410.  Specification of Letters Patent.  Patented Aug. 27, 1907.

Application filed October 24, 1906. Serial No. 340,306.

*To all whom it may concern:*

Be it known that I, ELLSWORTH J. EDWARDS, a citizen of the United States, and a resident of Los Angeles, in the county of Los Angeles and State of California, have invented a new and Improved Roller-Bearing, of which the following is a full, clear, and exact description.

This invention relates to certain improvements in roller bearings and more particularly to means for taking the end thrust and for preventing the rollers from getting out of alinement or one end of any roller advancing beyond the opposite end.

The object of the invention is to provide a simple construction, inexpensive to manufacture and easy to assemble.

In my improved bearing hereinafter described there are no grooves or flanges on either the bearing surface of the axle or the bearing surface of the boxing, the means for keeping the rollers in alinement consisting of intermediate rollers which travel with the main bearing rollers and serve not only to keep them in alinement, but also to keep them spaced the desired distance apart.

In my improved construction the bearing surfaces are provided with rounded ends bearing against convex collars or shoulders, whereby the line of contact is reduced to a minimum and yet the longitudinal movement of the roller prevented and a bearing surface provided to receive the ends of the rollers. As there are no flanges or collars on the main bearing surfaces engaging with any grooves in the rollers, or any flanges on the rollers engaging with grooves in the bearing surfaces, it will be readily seen that the rollers may be inserted endwise and the entire bearing easily assembled. No separate frame of any kind is provided to space the rollers or keep them in alinement, as the intermediate rollers fully and successfully accomplish this result unaided by external means.

Figure 5:
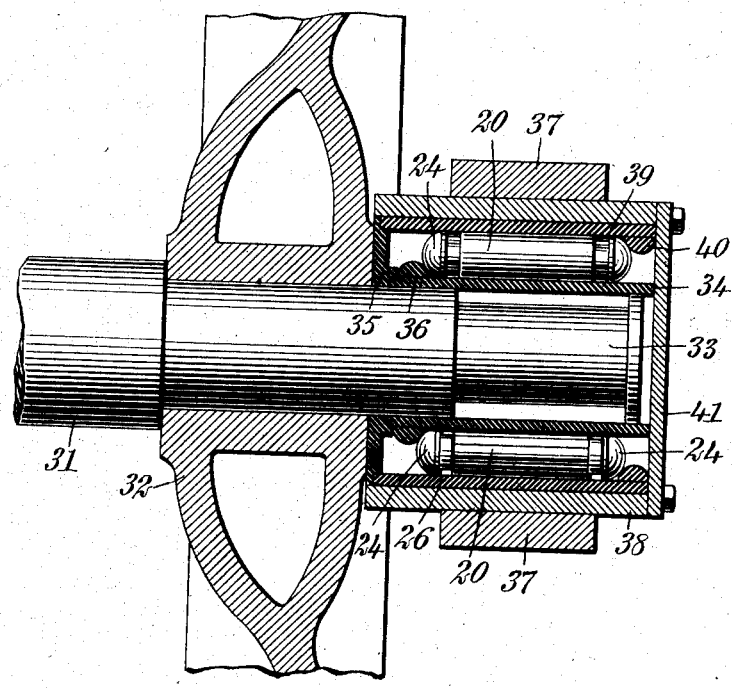
Figure 6:
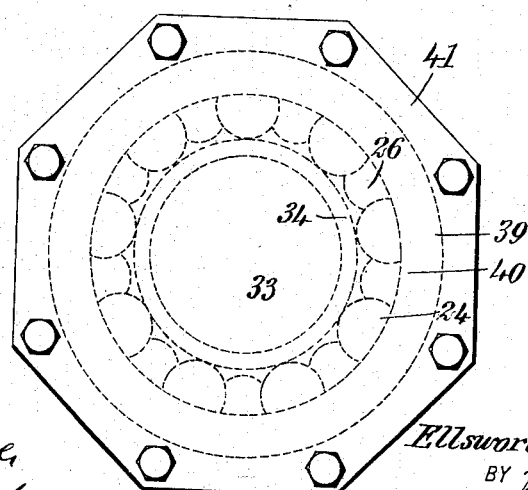

Reference is to be had to the accompanying drawings forming a part of this specification, in which similar characters of reference indicate corresponding parts in all the figures, in which Figure 1 is a central longitudinal section through a vehicle hub provided with my improved roller bearings; Fig. 2 is a transverse section on the line 2—2 of Fig. 1; Fig. 3 is a view of a plurality of bearing rollers and the intermediate rollers, showing the specific form of each and the manner in which they unlock; Fig. 4 is a side elevation of the inner bearing sleeve and the parts attached thereto; Fig. 5 is a central longitudinal section through a modified construction; and Fig. 6 is an end elevation thereof.

In Figs. 1, 2 and 4 I have illustrated my improved form of bearing as applied to a vehicle hub having a spindle 10, a hub 11, and radial spokes 12. Within the hub are secured two telescoping tubes 13 and 14, each of which is provided with a shoulder 15 connecting it to an enlarged bearing cylinder or bushing 16. The shoulders 15 are preferably provided with pins entering the opposite sides of the hub, and the two tubes 13 and 14 are forced together until the shoulders 15 are in contact with the opposite sides of the hub, and the pins serve to hold the tubes in their adjusted positions and prevent rotation of either tube in respect to the hub. Within each of the bearing cylinders or bushings 16 and adjacent its shoulder 15, is provided a collar 17 semi-circular in cross section and formed either integral with the bushing 16 or countersunk in a groove in the latter. The bushing or cylinder 16 with its collar 17 is preferably formed of steel, case-hardened and turned perfectly smooth to form the bearing surface against which the bearing rollers contact.

Within each cylinder or bushing 16 is a somewhat similar sleeve or bushing 18 tightly fitting the spindle 10 and having a polished outer surface. The distance between the bushing 16 and the bushing 18 is equal to the diameter of the rollers which I employ, the number and size of these rollers depending upon the load which they are required to carry. The bushing 18 is provided with a collar 19, semi-cylindrical in cross section and similar to the collar 17. The distance between these collars is substantially equal to the length of the rollers, or rather they are so located that the rollers contact with both.

The specific roller which I preferably employ has a cylindrical portion 20 intermediate its ends and separated from the ends by grooves 21, the sides of which are parallel and at right angles to the axis of the roller. The depth of each groove is substantially equal to one-quarter the diameter of the roller, thus leaving spindles 22 of a diameter substantially equal to one-half the diameter of the roller. Beyond these grooves are short cylindrical portions 23 provided with rounded or hemispherical ends 24. Intermediate or spacing rollers 25 are provided, each of which is formed of two disks or washers 26 connected by a journal or rod 27, the length of said rod being equal to the length of the cylindrical portion 20 of the bearing surfaces, and the thickness of the disks or washers 26 being substantially equal to the width of the grooves 21 in the bearing rollers. The disks or washers are slightly smaller in diameter than the cylindrical portion 20 of the bearing roller. The rod or journal 27 is just small enough so that it does not contact with the main rollers. The intermediate rollers are carried forward by the contact with the main rollers and turned in the opposite direction to the direction of rotation of the main rollers. The intermediate rollers being slightly smaller than the bearing rollers, they are out of contact with the bushings 16 and 18, and as their contact with the bearing rollers is of a rolling motion, very little, if any, friction is generated. The rounded ends of the rollers bear against the convex collars 17 and 19, and due to the curvature of both the end of the roller and of the collar, the line of contact is of a minimum width and very little friction is generated by the end thrust. The disks or washers 26 on the intermediate rollers prevent any endwise movement of one roller without a corresponding endwise movement of both of the adjacent rollers, and as they fill the space between the bearing rollers, it is impossible for the latter to get out of alinement. If any roller should become turned at an angle to the axis of the spindle 10, the grooves 21 of this roller must be moved slightly in a longitudinal direction, but such movement is effectually prevented by the disks or washers. The end thrust on the rollers tends to advance one end of each roller and retard the other end, and when the rollers are made very long and the grooves very shallow, the leverage becomes very great and the disks sometimes cut into the sides of the bearing rollers.

The bushing or sleeve 18 may, if desired, be mounted on the spindle 10 in such a manner as to be longitudinally adjustable, whereby the wear upon the ends of the rollers may be taken up, and preferably an outer collar or flange 28 may be employed to close the outer end of the space in which the rollers are located, and a nut 29 secured to the end of the spindle to effectually hold the parts in the desired relation. The flange or collar 28 is preferably provided with a groove 30, into which fits the end of the bushing 16, so as to make the casing as tight as possible and exclude any foreign matter.

In Figs. 5 and 6, I have illustrated a modified form of construction by which my improved bearing above described is adapted for use in connection with car axles. The car axle 31 is provided with any suitable form of a car wheel 32, and beyond the car wheel is provided an extension 33, having a bearing sleeve 34 surrounding the same and secured thereto. This sleeve 34 is provided with a flange 35 and a collar 36 similar to the collar and flange employed in the form above described. The frame 37 of the truck carries an octagonal casing 38 having a cylindrical inner bearing, and within this is provided a steel sleeve 39 having a convex collar 40. Bearing rollers and spacing rollers similar to those above described are employed between the sleeves 34 and 39 and contacting with the two convex collars 36 and 40. A face plate 41 is secured to the outer end of the casing 38 and serves to exclude dust and dirt from the bearing.

Having thus described my invention, I claim as new and desire to secure by Letters Patent:

1. A roller bearing, comprising an inner cylindrical bearing sleeve, an outer cylindrical bearing sleeve, collars semi-circular in cross section carried by each of said sleeves, a plurality of bearing rollers having cylindrical body portions in engagement with both of said sleeves and rounded end portions in engagement with said collars, each of said bearing rollers being provided with a plurality of circumferential grooves intermediate its ends, and means for spacing said rollers, said means comprising a plurality of intermediate rollers having circumferential flanges adapted to engage with the grooves of said bearing rollers, and having rods or journals connecting said circumferential flanges.

2. A roller bearing, comprising a plurality of bearing rollers having cylindrical body portions and rounded end portions of substantially the same diameter as the body portions and each separated therefrom by a circumferential groove, and means for spacing said rollers, said means comprising a plurality of intermediate rollers having circumferential flanges adapted to engage with the grooves of said bearing rollers and having rods or journals connecting said circumferential flanges.

3. A roller bearing, comprising an inner cylindrical bearing sleeve, an outer cylindrical bearing sleeve, collars carried by each of said sleeves, a plurality of bearing rollers having cylindrical body portions in engagement with both of said sleeves and end portions in engagement with said collars, each of said bearing rollers being provided with a plurality of circumferential grooves intermediate its ends, and means for spacing said rollers, said means comprising a plurality of intermediate rollers having circumferential flanges adapted to engage with the grooves of said bearing rollers and having rods or journals connecting said circumferential flanges.

4. A roller bearing, comprising an outer bearing sleeve, an inner bearing sleeve, collars semi-circular in cross section carried by both of said sleeves, a plurality of rollers having cylindrical bearing surfaces and rounded ends, the entire length of said cylindrical bearing surfaces being in engagement with both of said sleeves and said rounded ends being in engagement with said collars, and means for spacing said rollers.

5. A roller bearing, comprising an outer bearing sleeve, an inner bearing sleeve, collars semi-circular in cross section carried by both of said sleeves, a plurality of rollers having cylindrical bearing surfaces and rounded ends, and spaced therefrom by circumferential grooves, the entire length of said cylindrical bearing surfaces being in engagement with both of said sleeves and said rounded ends being in engagement with said collars, and means for spacing said rollers, said means comprising spacing rollers having circumferential flanges in engagement with the grooves of the rollers.

6. A roller bearing, comprising a plurality of bearing rollers having cylindrical bearing surfaces, each of said rollers having circumferential grooves adjacent the ends of its bearing surface, and spacing rollers located intermediate said bearing rollers and each provided with a circumferential flange adapted to engage in the grooves of the adjacent bearing rollers, the thickness of said flange being substantially equal to the width of said grooves.

7. A roller bearing, comprising a plurality of bearing rollers, each having a circumferential body portion forming a bearing surface and circumferential grooves adjacent each end of said body portion, the side walls of said grooves being at right angles to the axis of the roller, and a plurality of spacing rollers located intermediate said bearing rollers and each provided with a plurality of circumferential flanges having opposite parallel walls at right angles to the axes of said spacing rollers, said flanges being of a width substantially equal to the width of said grooves and adapted to interlock in said grooves to prevent longitudinal movement of any one of the rollers in respect to another.

In testimony whereof I have signed my name to this specification in the presence of two subscribing witnesses.

ELLSWORTH J. EDWARDS.

Witnesses:
 ELMER T. THOMPSON,
 HENRY M. DOLL.